Nov. 6, 1962 P. B. CLARK ET AL 3,062,953
LUMINAIRE AND REFRACTOR THEREFOR
Original Filed April 30, 1956 3 Sheets-Sheet 1
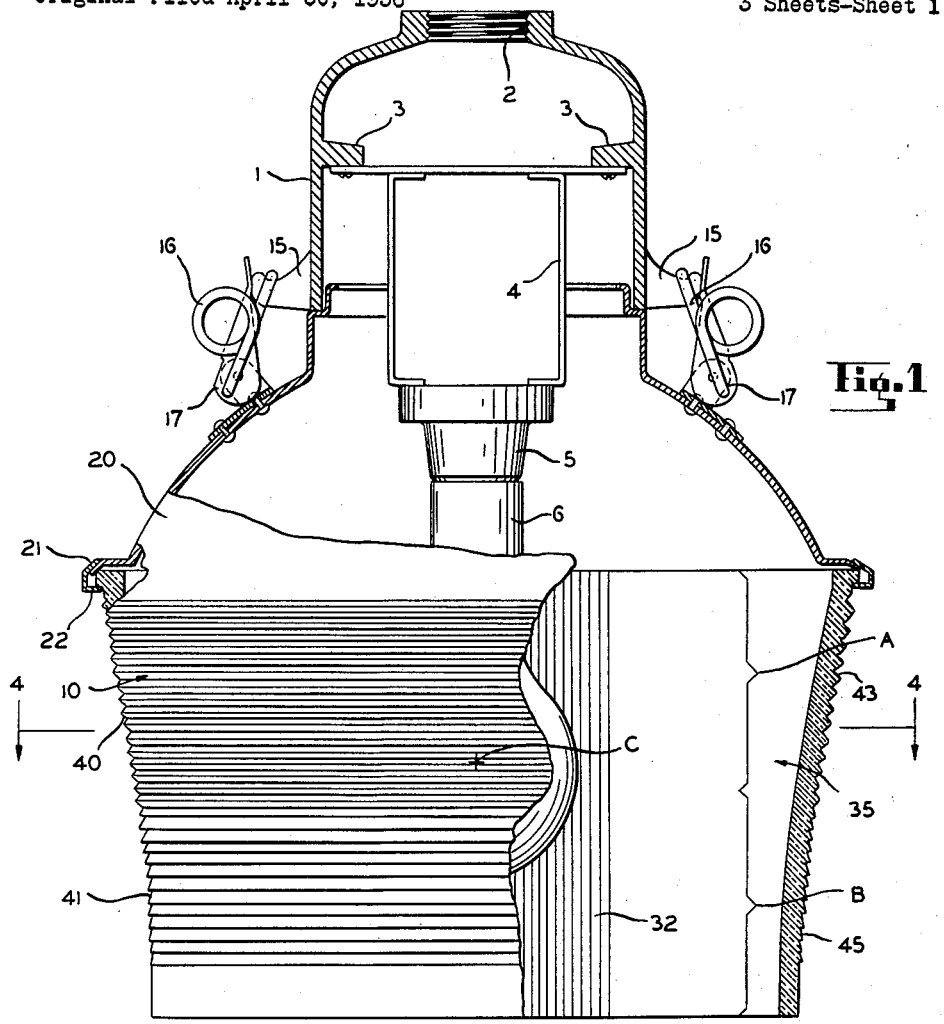
Fig.1
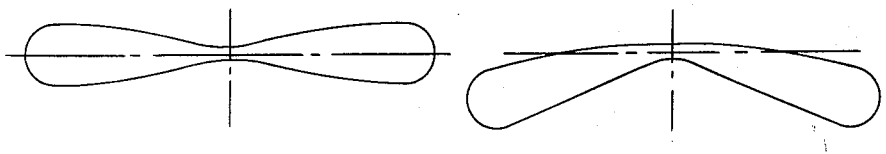
Fig.2
Fig.3
INVENTORS
PHILIP B. CLARK
DONALD W. HARLING
BY
ATTORNEY Nov. 6, 1962     P. B. CLARK ET AL     3,062,953
LUMINAIRE AND REFRACTOR THEREFOR
Original Filed April 30, 1956     3 Sheets-Sheet 2
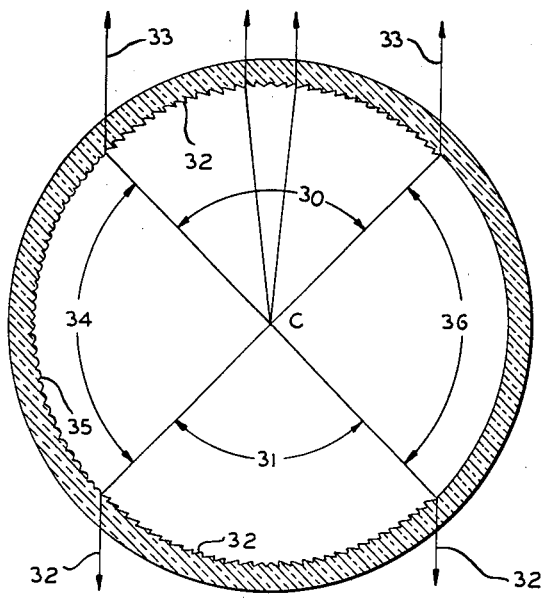
Fig.4
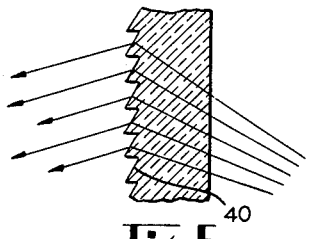
Fig.5
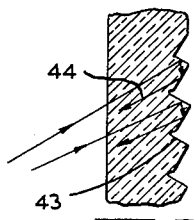
Fig.6
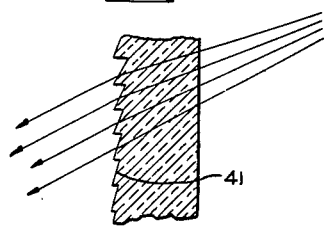
Fig.7
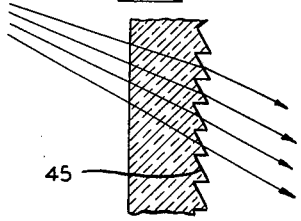
Fig.8
INVENTORS
PHILIP B. CLARK
DONALD W. HARLING
BY 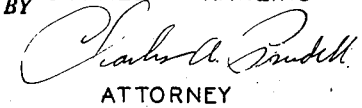
ATTORNEY

INVENTORS
PHILIP B. CLARK
DONALD W. HARLING
BY
ATTORNEY

United States Patent Office 3,062,953
Patented Nov. 6, 1962

3,062,953
LUMINAIRE AND REFRACTOR THEREFOR
Philip B. Clark, Hales Corners, and Donald W. Harling, Milwaukee, Wis., assignors to McGraw-Edison Company, a corporation of Delaware
Continuation of application Ser. No. 581,739, Apr. 30, 1956. This application May 5, 1959, Ser. No. 811,036
2 Claims. (Cl. 240—25)

The present invention relates to luminaires and is particularly directed to luminaires which are principally intended for street lighting purposes.

This application is a continuation of an application by Philip B. Clark and Donald W. Harling, Serial No. 581,739, filed April 30, 1956, now abandoned.

Single piece, open type refractor units have heretofore been used for outdoor lighting. However, as far as can be determined, these units have provided only symmetrical lateral light distribution, familiarly known as Type V distribution, as outlined at page 11 of the American Standard Association bulletin entitled: "American Standard Practice for Street and Highway Lighting" approved by the Illuminating Engineering Society on February 27, 1953.

It is, accordingly, a general object of this invention to provide a new and improved luminaire and refractor therefor principally for use in street and highway lighting, and capable of providing both symmetrical and asymmetrical light distribution.

It is another object of the present invention to provide a single piece refractor for a luminaire, wherein any of the presently known lateral and vertical light distribution patterns may be obtained through control by both external and internal prisms of both reflecting and refracting nature.

It is a specific object of the present invention to provide an open-ended, single piece luminaire refractor having reflecting prisms provided on its external surfaces wherein light rays emanating from a light source positioned internally thereof may be reflected away from prescribed portions to prismatic refracting portions for controlled vertical and lateral light distribution.

Other objects and advantages of the invention will be apparent from the following description and the accompanying drawings, in which:

FIG. 1 is a side elevational view, partly in section, of the complete luminaire assembly including an open-ended type refractor.

FIGS. 2 and 3 are light distribution curves. FIG. 2 showing the lateral distribution about a vertical axis and illustrating the refractor adapted for use in providing type I light distribution. FIG. 3 illustrates lateral light distribution about a vertical axis, wherein the refractor provides type II light distribution.

FIG. 4 is a cross sectional view taken on lines 4—4 of FIG. 1.

FIGS. 5, 6, 7 and 8 are relatively enlarged fragmentary sectional views of portions of the refractor of FIG. 1. As compared to FIG. 1; FIG. 5 represents a fragment of the left side of the upper portion A, FIG. 6 represents a fragment of the right side of the upper portion A, FIG. 7 represents a fragment of the left side of the lower portion B, and FIG. 8 represents a fragment of the right side of the lower portion B.

Figure 9:
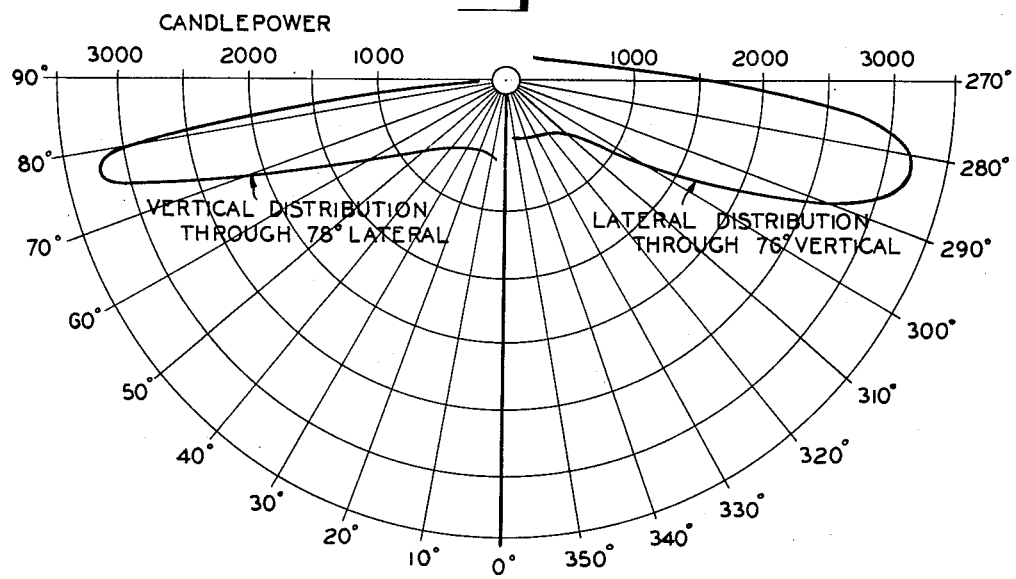
FIG. 9 is a candlepower distribution curve illustrating a representative light distribution in both vertical and lateral planes of a type II luminaire embodying the present invention.
Figure 10:
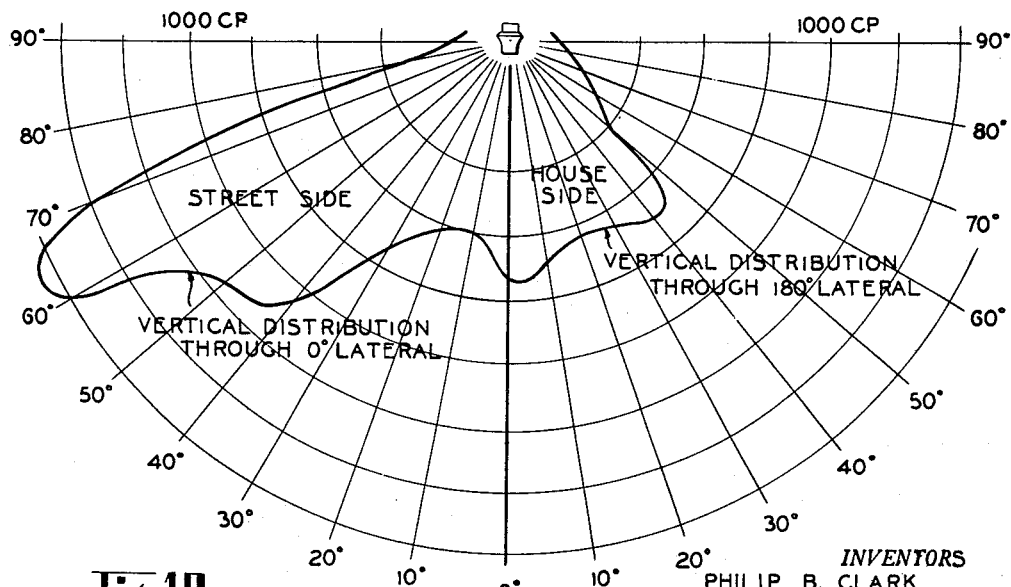
FIG. 10 is a candlepower distribution curve illustrating vertical distribution of a type II luminaire embodying the present invention taken in a plane passing through 0° and 180° lateral.

Referring now to the drawings, and in particular to FIG. 1, the luminaire there shown comprises a supporting enclosed head portion 1, which is illustrated as adapted for pendant mounting and having a threaded aperture 2 in its uppermost portion for receiving a supporting bracket fitting (not shown). It will be apparent, however, that any conventional head member may be provided for any desirable mounting, such as conventional side mounting with a slipfitter arrangement (not shown). The interior of the head 1 may be provided with opposed mounting lugs for pendant mounting of a lamp support 4, having a conventional socket portion 5 for releasably receiving a light source, such as an incandescent bulb, or a gaseous discharge bulb 6. The "effective center" of the light source is denoted generally by the reference character C. The center C of the light source preferably coincides with the focal center of the prismatic globe or refractor, denoted generally by the reference numeral 10.

The head 1, which may be of die cast construction, preferably includes opposed external projecting hook-like clamping lugs 15 for releasable engagement with the resilient latching portion 16 of the clamp members 17 of the reflector 20. The dome-like reflector 20 may have its interior surface provided either with a diffused or specular finish, as desired. It has been found in actual practice that a diffused surface will provide ample light distribution inasmuch as the present luminaire preferably has the effective center of its light source entirely internally of the refractor 10.

It is to be noted that substantially all of the useable light flux emanating from the source is directed towards the prismatic refractor surfaces and not as reflected light as in conventional luminaires. The present construction permits the "effective center" of the light source to be positioned wholly within the refractor portion. It is a well known fact that there is a considerable loss of light if the rays are reflected just before reaching the refractor. This has been measured in certain instances, even in highly specular reflectors, to be as much as a 15% loss of light flux. The reflector 20 is preferably circumferentially flanged at its lower end portion 21, and is formed inwardly at its extremity to receive the flange portion 22 of the refractor 10.

Referring particularly to FIGS. 1 and 4 through 8, it will be apparent that the refractor 10 has been provided with a generally cylindrical configuration having its lowermost portion, as viewed in FIG. 1, open to the atmosphere. Obviously, such design permits relatively inexpensive manufacturing techniques, excellent cooling characteristics, room for larger lamps, and relative ease in re-lamping. The re-lamping may be done by means of an extended lamp stick (not shown) for graspingly engaging the lamp 6 from below the luminaire without requiring detachment of any of the respective parts. In addition, the construction permits a refractor which maintains its cleanliness and does not have to be provided with waterproof seals to prevent the accumulation of water, insects, etc., as in totally enclosed refractors.

It is to be noted, however, that the exposed or open end of the refractor 10 may be enclosed with a cover plate (not shown) of transparent material, such as glass clamped or fused to the refractor portion if so desired. Thus, it is intended that the term "open-type" refractor, as used throughout the present specification, is to be considered in its broadest sense to define a refractor provided with a transparent closure member without departing from the scope of the present invention.

It will be noted in FIG. 1 of the drawings that the refractor 10 has an outwardly directed increasing slope which is greater at the upper portion of the refractor than the lower portion thereof. In said figure, for the purpose of clearer disclosure, the refractor is shown as arbitrarily divided into two sections, A and B. The section A flares outwardly at a greater angle than does the lower section B of the side walls of the refractor. This increasing slope is functionally significant because it enables the upper prisms of the refractor to effectively refract the light through the large vertical angles required. This eliminates high losses due to scattering at the high vertical angles and achieves low intensity on the high angles of the house side, thereby avoiding undesirable light in the windows of buildings adjacent to and facing the street. In the lower part of the reflector the light rays from the lamp do not have to be bent at such a great angle, and the reduced slope, therefore, allows the opening in the bottom to be made quite large, facilitating passage of lamp remover devices. The outward draft provided by the slope also facilitates removal of the glass mold plunger during molding of the refractor.

It will also be observed in FIG. 1 that there is a low height to diameter ratio of the refractor. The refractor 10 extends well below the effective light center C, and most of the light that forms the main beam is thus controlled by the refractor. It will be noted that the height of the refractor above the light center is limited, and the reflector thus controls the light emitted from the higher angles of the light source. At such high angles the reflector is more efficient than reflecting prisms. In general, a one-part plunger is preferred for manufacture. It will be apparent from FIG. 4 that the interior surfaces of the refractor 10 may be provided with a variety of prismatic configurations. For instance, the sectoral portions 30 and 31 comprise a series of juxtaposed vertical saw-tooth prisms 32 for effective lateral light control to provide the main candlepower beams 33 substantially parallel with the axis of a street or highway where used for that purpose. The particular refractor illustrated will provide the generally characteristic type II lateral distribution shown in FIG. 3 and especially as shown in FIG. 9 wherein the lateral distribution was taken through 76° vertical.

The sector 34 is preferably located on the street side of the luminaire and may be provided with a striated fluted rigging 35 to provide a generally diffused light transmission to external prisms, as will hereinafter be described. As shown, the portion 36 is preferably positioned at the house side and, in general, no internal prismatic configuration is provided for this sector.

As mentioned above, the present luminaire and refractor have been illustrated to provide the type II light distribution of FIG. 3 which has been defined in the aforementioned American Standards Association bulletin, as having a preferred lateral width of 25° within an acceptable range of 20° to less than 30° measured from a plane parallel with the longitudinal axis on the roadway. This distribution is generally applicable to luminaries located at or near the side of relatively narrow roadways. It is also used on wide roadways in opposite arrangements. The acceptable lateral distribution in the cone of maximum candlepower is shown on FIG. 3, and is particularly illustrated in connection with the subject luminaire on the curve of FIG. 9 measured in a 76° vertical cone. It will be apparent, however, that the internal prisms of the sectors 30 and 31 may be cut or molded to provide lateral distribution of other designated types, including a symmetric distribution of the type V, applicable to luminaire locations near one corner of a right angle intersection or for other practice at or near right-angle intersections.

In the latter case, however, the vertical prisms are distributed throughout the entire circumference of the luminaire (not shown).

Inasmuch as comparatively little light is required at the house side in the horizontal or lateral plane, no vertical prisms have been provided in the sectoral portion designated 36. The diffusing fluted ribbing 35 of the portion 34 at the street side generally provides the oncoming motorist with an impression that there is a broad light source from which to orient himself while traveling in a direction towards the luminaire. The fluting provides a generally diffused light distribution offering the appearance of the broader light source.

As far as the external prismatic configuration is concerned, attention is directed to FIGS. 1 and 5 through 8, wherein it will be seen that vertical light distribution is obtained through the use of a series of arcuate juxtaposed prismatic ribs externally of the refractor 10. It is to be noted that the uppermost portion A of the sectors 30, 34 and 31 of the refractor 10 is provided with relatively inclined prisms 40 for projecting light received from the center C therebelow away from Zenith and towards the street surface, whereas the lower portion B of the sectors 30, 34 and 31 of refractor 10 is provided with prisms 41 having relatively less inclination for redirecting the light rays from the effective light source center C located thereabove as viewed in FIG. 1 to the preferred vertical distribution angle. In the case of type I and type II vertical distributions, the vertical angles of maximum candlepower range from 73° to 80°, whereas types III, IV and V vertical angles of maximum candlepower range from 70 to 77°. The preferred vertical distribution of the present luminaire is shown in FIG. 9 as taken through 78° lateral measured from a plane normal to the longitudinal axis of the roadway and passing through the effective center of the refractor.

The prisms 43 of FIG. 6 are of particular importance, and comprise reflecting prisms 43 distributed externally of the sectoral portion 36, as viewed in FIG. 4 and are preferably located at the house side where the luminaire is used in street lighting application. It will be apparent that the single-piece refractor 10 may be provided with reflecting prisms which receive light rays emanating from the effective center C of the light source and to redistribute these rays as shown in FIG. 6 as rays or beams 44, which return the light flux to become a part of the flux directed towards diametrically opposed portions of the refractor 10 to add to the main candlepower beam.

Referring to FIG. 8, it will be seen that portion B of sector 36 may be provided with depressing prisms 45 for refracting light received from the effective center C to the sidewalk below the luminaire and away from adjacent house windows. In certain cases it has been found desirable to omit the prisms 45 and substitute vertical reflecting prisms, inasmuch as sufficient light escapes from the open or transparent bottom to light the walk areas which are relatively close to the luminaire standard (not shown).

It will become apparent that other conventional street lighting luminaire distribution patterns may be easily obtained through proper arrangement of the above-illustrated prismatic configurations in desired refractor sectoral portions. For instance, the type I lateral distribution of FIG. 2 may be readily obtained by simply providing the sector 36 at diametrically opposed sides, or if more light is desired, a modified type I distribution (not shown) may be provided with sectoral portions 34 diametrically opposite one another. Type V distribution, as previously mentioned, may be provided by continuous application of the prismatic configurations of sector 34 throughout the entire periphery of the refractor.

Further, conventional types I and II, four-way distribution is readily obtained through the proper selection of prismatic angles similar to those of sectors 30 and 31 in selected sectors of the refractor.

It will be apparent that the present invention has provided an improved luminaire particularly adaptable for street and highway lighting, which is relatively inexpensive to manufacture, convenient to maintain and which provides effective light distribution through the use of a single-piece refractor member.

We claim:

1. In a luminaire for outdoor area lighting, a dome-shaped reflector, a unitary, annular ring-shaped refractor having one end secured to and enclosed by said reflector, said reflector also serving as a cover for said refractor, said refractor presenting inner and outer wall surfaces, a light source, means within said refractor for mounting said light source with its effective center coincident wtih the axis of revolution of said refractor and intermediate the ends thereof wholly within said refractor whereby substantially all light emitted by said source is directed to said refractor at angles at which said light can be redirected by said refractor to the area to be lighted, the inner wall surface of said refractor being divided into two pairs of opposed arcuate sectors, each sector of the first pair of said opposed sectors having a plurality of longitudinally disposed refracting prisms formed thereon substantially parallel with the said axis of revolution, the refracting faces of said refracting prisms being oppositely angled from the sides to the center of each of said sectors of said first pair whereby the diverging light rays from said light source falling on said refracting prisms will be directed outwardly from said refractor in oppositely disposed directional beams, one sector of the second pair of opposed sectors having a plane surface and the other sector of said second pair having a plurality of longitudinally disposed light diffusing ribs formed thereon, said outer wall surface having a plurality of parallel, annular refracting prisms formed thereon, the said annular refracting prisms having their refracting surfaces of increasing angularity from bottom to top of the refractor, the portion of said outer wall surface corresponding to the plane surfaced sector of the second pair of opposed sectors having refracting means on the upper portion thereof for reflecting substantially all of the light received therefrom back toward the opposite wall surface of the refractor.

2. In a luminaire for outdoor area lighting, a dome-shaped reflector, a unitary, annular ring-shaped refractor, said refractor presenting inner and outer wall surfaces, a light source, means within said refractor for mounting said light source with its effective center coincident with the axis of revolution of said refractor and intermediate the ends thereof wholly within said refractor whereby substantially all light emitted by said source is directed to said refractor at angles at which said light can be redirected by said refractor to the area to be lighted, the inner wall surface of said refractor being divided into two pairs of opposed arcuate sectors, each sector of the first pair of said opposed sectors having a plurality of longitudinally disposed refracting prisms formed thereon substantially parallel with the said axis of revolution, the refracting faces of said refracting prisms being oppositely angled from the sides to the center of each of said sectors of said first pair whereby the diverging light rays from said light source falling on said refracting prisms will be directed outwardly from said refractor in oppositely disposed directional beams, one sector of the second pair of opposed sectors having a plane surface and the other sector of said second pair having a plurality of longitudinally disposed light diffusing ribs formed thereon, said outer wall surface having a plurality of parallel, annular refracting prisms formed thereon, the said annular refracting prisms having their refracting surfaces of increasing angularity from bottom to top of the refractor, the portion of said outer wall surface corresponding to the plane surfaced sector of the second pair of opposed sectors having refracting means on the upper portion thereof for reflecting substantially all of the light received therefrom back toward the opposite wall surface of the refractor.

References Cited in the file of this patent

UNITED STATES PATENTS

| | | |
|---|---|---|
| 804,254 | Mygatt | Nov. 14, 1905 |
| 1,259,493 | Dorey | Mar. 19, 1918 |
| 1,644,915 | Dorey | Oct. 11, 1927 |
| 2,214,861 | O'Neil | Sept. 17, 1940 |
| 2,307,247 | Tuck et al. | Jan. 5, 1943 |

FOREIGN PATENTS

| | | |
|---|---|---|
| 576,591 | Great Britain | Apr. 11, 1946 |